United States Patent [19]
Oda

[11] Patent Number: 5,869,017
[45] Date of Patent: Feb. 9, 1999

[54] METHOD OF PRODUCING TRICHLOROSILANE HAVING A REDUCED CONTENT OF DICHLOROSILANE

[75] Inventor: Hiroyuki Oda, Tokuyama, Japan

[73] Assignee: Tokuyama Corporation, Yamaguchi-ken, Japan

[21] Appl. No.: 72,743

[22] Filed: May 6, 1998

[30] Foreign Application Priority Data

May 12, 1997 [JP] Japan ..................................... 9-120407

[51] Int. Cl.$^6$ ..................................................... C01B 33/04
[52] U.S. Cl. ............................................................. 423/342
[58] Field of Search ............................................... 423/342

[56] References Cited

U.S. PATENT DOCUMENTS

| | | | |
|---|---|---|---|
| 3,627,501 | 12/1971 | Kruger | 423/342 |
| 3,704,104 | 11/1972 | Bawa et al. | 423/342 |
| 4,836,997 | 6/1989 | Lepage et al. | 423/342 |

Primary Examiner—Paul F. Shaver

[57] ABSTRACT

A method of producing trichlorosilane having a reduced content of dichlorosilane, which comprises reacting a mixture of dichlorosilane and trichlorosilane with hydrogen chloride in the presence of activated carbon as a catalyst at a temperature of 0° C. or higher and lower than 75° C. to selectively convert dichlorosilane into trichlorosilane.

7 Claims, No Drawings

METHOD OF PRODUCING TRICHLOROSILANE HAVING A REDUCED CONTENT OF DICHLOROSILANE

BACKGROUND OF THE INVENTION

The present invention relates to a method of producing trichlorosilane having a reduced content of dichlorosilane from a mixture of dichlorosilane and trichlorosilane. More specifically, it relates to a method of producing trichlorosilane having a reduced content of dichlorosilane by removing by-produced dichlorosilane efficiently for the production of high-purity polycrystal silicon.

The most common method of producing high-purity polycrystal silicon uses trichlorosilane as a raw material. Trichlorosilane is first purified by distillation and separated into high-purity purified trichlorosilane, other chlorosilane and impurities to be discarded. The "chlorosilane" referred to herein is a generic term for compounds comprising silicon, chlorine and/or hydrogen, such as trichlorosilane and silicone tetrachloride. Then, the purified trichlorosilane obtained by distillation is caused to react with hydrogen and the reaction product is subjected to thermal decomposition and reduction to produce high-purity polycrystal silicon. Particularly, a method of producing a rod-shaped deposit is called "Siemens method" and widely and commonly employed.

In a method of depositing polycrystal silicon using trichlorosilane as a raw material, dichlorosilane is by-produced and dichlorosilane is generally separated from trichlorosilane.

The separated dichlorosilane is discarded or recycled.

To recycle dichlorosilane, JP-A Hei 2-97415 (the term "JP-A" as used herein means an "unexamined published Japanese patent application") proposes a method of supplying dichlorosilane into a reactor for carrying out a reaction between silicon and hydrogen chloride. JP-A Hei 1-283817 proposes a method of obtaining trichlorosilane by reacting dichlorosilane with silicon tetrachloride in the presence of an amino compound catalyst on a resin. However, these methods require a large-scale apparatus.

To solve these problems and simplify the apparatus, JP-A Hei 7-315829 proposes a method in which an exhaust (vent) gas from various reactors in the production process of polysilicon is reacted with hydrogen chloride on a metal catalyst such as palladium or platinum at 30° to 400° C. to convert a Si—H bond contained in the exhaust gas into a Si—Cl bond. This method is excellent and can be carried out with simple equipment. It involves, however, a problem that due to its high reaction activity to chlorination, even trichlorosilane to be used for deposition is converted into silicone tetrachloride simultaneously when dichlorosilane is converted into trichlorosilane. Therefore, development of a method of allowing only dichlorosilane or a silane having a boiling point lower than that of dichlorosilane to selectively react with hydrogen chloride has been desired to overcome the above defect.

SUMMARY OF THE INVENTION

The inventor of the present invention has conducted studies on the selectivity of a reaction between hydrogen chloride and chlorosilane, that is, on a catalyst which reacts with dichlorosilane but not with trichlorosilane. As a result, they have found that a selective reaction readily occurs within the pore of activated carbon under certain conditions. They have conducted further studies and found a favorable method of chlorinating only dichlorosilane and silanes having a boiling point lower than that of dichlorosilane from a mixture gas of trichlorosilane and dichlorosilane. Thus, the present invention has been achieved.

That is, the present invention is a method of producing trichlorosilane having a reduced content of dichlorosilane, which comprises reacting a mixture of dichlorosilane and trichlorosilane with hydrogen chloride in the presence of activated carbon as a catalyst at a temperature of 0° C. or higher and lower than 75° C. to selectively convert dichlorosilane into trichlorosilane.

DETAILED DESCRIPTION OF THE INVENTION

The activated carbon used in the present invention does not need to be special one but may be a product on the market. As for the pore diameter of the activated carbon, the pore radius (R) showing the maximum peak in a pore distribution curve obtained by a steam adsorption method is preferably 8 to 40 Å. The activated carbon is preferably heated at 150° C. or higher to be dehydrated and dried prior to use. When the activated carbon contains moisture, chlorosilanes are hydrolyzed to cause deterioration of the activity of the catalyst. Here, it must be noted that when a metal having catalytic activity, such as nickel, iron, platinum or palladium exists on the surface of the pore of the activated carbon, there is a great tendency toward the chlorination of useful trichlorosilane due to extremely high reaction activity to chlorination and in consequence, selective chlorination, which is the object of the present invention, is hardly effected.

The method of the present invention is to selectively chlorinate dichlorosilane into trichlorosilane. As a chlorine source for chlorination, gaseous hydrogen chloride is used. Although dichlorosilane has slightly higher activity for a chlorination reaction than trichlorosilane, the delicate control of reaction conditions is required to selectively react only dichlorosilane from a mixture thereof. Meanwhile, a chlorination reaction on the activated carbon is very sensitive to temperature and hence, by making use of this fact, that is, by precisely controlling the temperature of gas passing through the activated carbon, a selective reaction is made possible. When the temperature is too high, trichlorosilane is also chlorinated, while when the temperature is too low, the chlorination reaction of dichlorosilane does not take place. Therefore, to selectively react dichlorosilane from the mixture gas, the temperature of gas passing through the activated carbon is set to 0° C. or higher and lower than 75° C. It is preferably 0° C. or higher and lower than 50° C., more preferably 0° C. or higher and lower than 30° C. Since the chlorination reaction on the activated carbon is very sensitive to temperature, the control of temperature is very important, while much care does not need to be taken for the control of contact time. For instance, when the activated carbon grinds having around 5 mm in size are used, dichlorosilane is converted into trichlorosilane and a favorable result with silicon tetrachloride scarcely produced can be obtained by setting the contact time to 0.5 sec or more and 30 sec or less. Much care does not need to be taken for the control of the supply of hydrogen chloride as well. Excessive hydrogen chloride which has not reacted with dichlorosilane on the activated carbon rarely reacts with trichlorosilane under the above temperature conditions of the present invention and exhausted to the outside of the system. In the present invention, since monochlorosilane and monosilane having higher reactivity than dichlorosilane also readily react with hydrogen chloride, monochlorosilane and monosilane are also converted into trichlorosilane. Further, as impurities having higher reactivity to chlorination than trichlorosilane, such as silylphosphine are also selectively chlorinated, they are easily separated from trichlorosilane.

Since dichlorosilane is a dangerous substance having high ignitability and has a low boiling point, it is often used after mixed with trichlorosilane or silicon tetrachloride to enhance safety. Since only dichlorosilane contained in a mixture gas can be selectively converted into trichlorosilane by the method of the present invention, it can be particularly advantageously used in such a mixture gas. To handle dichlorosilane safely, the concentration of dichlorosilane may be adjusted to 85% or less based on the total of chlorosilanes. Other components may be trichlorosilane and/or silicone tetrachloride. When a large amount of gas or liquid is used as in a polycrystal silicon production plant, it is preferred to mix dichlorosilane with trichlorosilane and silicone tetrachloride in such an amount that safety can be further enhanced and an accident is not caused even by occurrence of a trouble, for example, dichlorosilane in an amount of 50 wt % or less and trichlorosilane and silicone tetrachloride in a total amount of 50 wt % or more based on the total of chlorosilanes. The method of the present invention can be used even in this concentration without a problem.

The present invention can be also applied to the Siemens method, that is, a gas exhausted from a reactor for depositing polycrystal silicon using trichlorosilane as a raw material. The exhaust gas contains low-boiling chlorosilanes including hydrogen, hydrogen chloride, silicone tetrachloride, trichlorosilane and dichlorosilane; monosilane; and high-boiling chlorosilanes. When the high-boiling chlorosilanes of large quantities comes into contact with activated carbon, the rate of a reaction between the high-boiling chlorosilanes and hydrogen chloride is small under the temperature conditions of the present invention. Hence, the high-boiling chlorosilanes are adhered around the activated carbon to lower the reactivity of the activated carbon with dichlorosilane. Therefore, when dichlorosilane contained in an exhaust gas is reacted with hydrogen chloride for deposition, the exhaust gas is cooled to a temperature of 30° C. or lower in advance to almost separate high-boiling chlorosilane having a higher boiling point than that of silicon tetrachloride and then allowed to pass through the activated carbon, whereby a trouble can be prevented. The high-boiling chlorosilane can be reacted at a higher temperature separately as required.

The following examples are given to further illustrate the present invention.

EXAMPLE 1

Activated carbon having a pore radius of 25 Å and an average particle diameter of 3 mm was charged into a stainless steel cylindrical container. The activated carbon was dehydrated in a nitrogen atmosphere at 150° C. for 10 hours as a pre-treatment. A chlorosilane mixture solution containing dichlorosilane, trichlorosilane and silicone tetrachloride was gasified, diluted with a hydrogen gas and then, allowed to pass through the container filled with the activated carbon together with a hydrogen chloride gas. The residence time of the gas in the container filled with the activated carbon was 8 seconds when the container was empty. The composition of the gas at the outlet of the container when the temperature of the gas passing through the container was set at 10° C. and the composition of the gas at the inlet of the container are shown in Table 1. The reaction selectivity is expressed by [hydrogen chloride used in reaction with dichlorosilane]/[consumed hydrogen chloride]×100 (%). Almost all dichlorosilane contained in the supplied mixture gas was converted into trichlorosilane and the conversion of trichlorosilane into silicon tetrachloride was hardly seen.

EXAMPLES 2 AND 3

The procedure of Example 1 was repeated except that the temperature of the gas passing through the container was changed as shown in Table 1. The results are shown in Table 1.

Comparative Example 1

The same conditions as those of Example 1 were employed except that the temperature of the gas passing through the container was set to 120° C. Due to increased reaction activity, all hydrogen chloride contained in the supplied mixture gas was consumed while trichlorosilane was converted into silicon tetrachloride. This is supposedly because part of hydrogen chloride first reacted with trichlorosilane or because the conversion of dichlorosilane into silicon tetrachloride proceeded. As a result, hydrogen chloride required for reacting with dichlorosilane was consumed and dichlorosilane to be converted remained.

Comparative Example 2

The activated carbon used in Example 1 was immersed in a solution of palladium nitrate to carry palladium within the pore of the activated carbon, and dried fully. The same conditions as those of Example 1 were employed except that this activated carbon was used. The results were almost the same as those of Comparative Example 1.

TABLE 1

|  | Gas temperature (°C.) | Dichlorosilane (wt %) | Trichlorosilane (wt %) | Silicon tetrachloride (wt %) | Hydrogen (wt %) | Hydrogen chloride (wt %) | Selectivity (%) |
| --- | --- | --- | --- | --- | --- | --- | --- |
| Composition at inlet | — | 11.5 | 47.6 | 9.1 | 23.4 | 8.4 | — |
| Example 1 | 10 | 0.4 | 61.4 | 10.5 | 23.6 | 4.1 | 93 |
| Example 2 | 20 | 0.6 | 59.0 | 13.1 | 23.6 | 3.6 | 82 |
| Example 3 | 40 | 1.2 | 52.2 | 20.7 | 23.7 | 2.2 | 60 |
| Comparative Example 1 | 10 | 2.9 | 39.4 | 33.8 | 23.9 | 0 | 37 |
| Comparative Example 2 | 120 | 4.7 | 34.5 | 36.9 | 23.9 | 0 | 29 |

According to the present invention, dichlorosilane contained in a mixture of dichlorosilane and trichlorosilane can be selectively converted into trichlorosilane and the by-production of a higher-order chlorinated product such as silicon tetrachloride can be suppressed.

What is claimed is:

1. A method of producing trichlorosilane having a reduced content of dichlorosilane, which comprises reacting a mixture of dichlorosilane and trichlorosilane with hydrogen chloride in the presence of activated carbon as a catalyst at a temperature of 0° C. or higher and lower than 75° C. to selectively convert dichlorosilane into trichlorosilane.

2. The method of producing trichlorosilane according to claim 1, wherein the reaction temperature is 0° C. or higher and lower than 50° C.

3. The method of producing trichlorosilane according to claim 1, wherein the activated carbon has virtually no metal catalyst existent on the surface.

4. The method of producing trichlorosilane according to claim 1, wherein the pore radius (R) showing the maximum peak in a pore distribution curve, obtained by a steam adsorption method, of the activated carbon is 8 to 40 Å.

5. The method of producing trichlorosilane according to claim 1, wherein the mixture of dichlorosilane and trichlorosilane contains dichlorosilane in an amount of 85 wt % or less based on the total of all chlorosilanes.

6. The method of producing trichlorosilane according to claim 1, wherein the mixture of dichlorosilane and trichlorosilane contains dichlorosilane in an amount of 50 wt % or less and trichlorosilane and silicon tetrachloride in a total amount of 50 wt % or more based on the total of all chlorosilanes.

7. The method of producing trichlorosilane according to claim 1, wherein a gas exhausted from a reactor for depositing polycrystal silicon using trichlorosilane as a raw material is first cooled to 30° C. or lower to separate almost all chlorosilanes having a higher boiling point than that of silicon tetrachloride and then, allowed it as a mixture of the dichlorosilane and trichlorosilane to pass through the activated carbon.

* * * * *